United States Patent [19]

Dogliotti

[11] 4,362,751
[45] * Dec. 7, 1982

[54] PASTRY PRODUCT AND METHOD OF MAKING SAME

[75] Inventor: Amilcare Dogliotti, Alba, Italy

[73] Assignee: Ferrero S.p.A., Alba, Italy

[*] Notice: The portion of the term of this patent subsequent to Jun. 26, 1996, has been disclaimed.

[21] Appl. No.: 946,275

[22] Filed: Sep. 27, 1978

Related U.S. Application Data

[62] Division of Ser. No. 820,184, Jul. 29, 1977, Pat. No. 4,159,348.

[30] Foreign Application Priority Data

Aug. 17, 1976 [IT] Italy ............................ 69028 A/76
Jun. 7, 1977 [IT] Italy ............................ 68308 A/77

[51] Int. Cl.$^3$ ........................................ A21D 13/08
[52] U.S. Cl. .................................................. 426/94
[58] Field of Search ............ 426/23, 89, 94, 103, 426/244, 303, 306, 497

[56] References Cited

U.S. PATENT DOCUMENTS 3,208,855  9/1955  Enoch et al. ................... 426/549
3,784,714  1/1974  McReynolds et al. ......... 426/306
3,814,819  6/1974  Morgan ........................... 426/103

OTHER PUBLICATIONS

Fahy, Cooking With Beer, 1972, Gt. Britian, pp. 106–115.
Child et al., Mastering the Art of French Cooking, vol. 2, 1974, N.Y., pp. 376–377.
Cohen, After All, 1974, N.Y., p. 22.
Fshirky, "Oscar" of the Waldorf's Cookbook, 1975, N.Y., pp. 749–750; 772–773, 778.

*Primary Examiner*—Raymond N. Jones
*Assistant Examiner*—Elizabeth A. Hatcher
*Attorney, Agent, or Firm*—Bernard, Rothwell & Brown

[57] ABSTRACT

A pocket-size cake comprising a preferably parallelepipedic portion of bread component completely enrobed with chocolate and impregnated with a spirituous sugar-containing liqueur in a proportion of at least 1 wt. part liqueur to 1 wt. part bread component, the liqueur providing at least 35 ml ethyl alcohol and at least 25 grams sugar in each 100 grams bread component. The chocolate contains at least 30 wt. % edible fat and the bread component has a prevailingly cellular structure composed of substantially closed cells. The portion of bread component preferably consists of two layers bonded together by a layer of cream. A commercial method of making the cake is also disclosed.

12 Claims, 7 Drawing Figures

PASTRY PRODUCT AND METHOD OF MAKING SAME

This is a Division of application Ser. No. 820,184, filed July 29, 1977, now U.S. Pat. No. 4,159,348.

This invention relates to a novel pastry product and to a method for obtaining the product.

The novel product, hereinafter called "pocket cake" (from Italian term "tortina"), is mainly characterized in that it comprises:

(a) a portion of sweet bread impregnated with a spirituous sugar-containing liqueur in a proportion of at least 1 part by weight liqueur to 1 part by weight bread;

(b) a coating of chocolate completely enveloping said portion of bread;

(c) the said liqueur providing at least 35 ml ethyl alcohol and at least 25 grams sugar (saccharose and/or glucose) in each 100 grams bread;

(d) said chocolate containing at least 30 wt.% of edible fat (typically cocoa butter, if desired in admixture with cow butter);

(e) the said bread having prevailingly a cellular structure in which the total area of the eventual apertures through which a cell communicates with its adjacent cells does not exceed 30% (preferably does not exceed 10%) of the total internal area (walls plus apertures, if any) of the cell.

The term "bread" is used here in its conventional sense of the relatively soft product obtained by baking in an oven a raised dough of wheat flour and water; the term "sweet bread" means that the dough formulation comprises a sweetener, such as common sugar, honey or other convenient substance.

In the art of bread- or cake-making various types of bread are known, obtained by mixing and kneading together selected ingredients and by raising the resulting dough with the aid of natural yeasts, chemical yeasts or other raising agents. It is also known that the dough may contain added proteic substances. Addition of proteins is typical in dietetic products, for example. A common source of added proteins consists of egg yolks; an egg yolk notoriously contains (as average) about 17 wt.% proteins, about 32 wt.% fats and about 50 wt.% water. Moreover, various protein concentrates are commercially available as additives for bakery products. A typical source of proteins for dietetic products is gluten. It is known that gluten is normally present in cereal flours. Wheat flours for bread- and pastry-making typically contain 8-9 wt.% gluten, and it is known that in the absence of gluten obtention of the typical spongy structure of conventional bread would be practically impossible to obtain. In order to obtain improved structure and mechanical properties the gluten must be "vital"; "devitalized" gluten (obtained by high-temperature drying) has poor hydration properties, poor cohesion and low elasticity, and these drawbacks make it unsuitable for bread-making purposes.

Many pastry-makers produce, on artisanal basis and for an almost immediate consumption, cakes and similar pastry products which, after baking, are additioned with a small amount of a liqueur, typically rum or maraschino. The product obtained in this way is agreeable to consumers owing to its pleasant fragrance and taste. As referred to the "bread" component of the product, the amount of added liqueur is relatively small, generally less than 30 wt.%. Amounts greater than 30% do not improve the product quality, while amounts exceeding 50 wt.% destroy the consistency of the product with the result that the "bread" component collapses and the product becomes unattractive. In any case, the preservability of the product containing added liqueur amounts to a few days only, due to growth of molds, even if the product is kept in a hermetically sealed condition.

Therefore, at this point, it is evident to those skilled in the art that the "pocket cake" according to this invention provides a new class of pastry products. In fact, the liqueur content of at least 100 wt.% (referred to the bread component), typically from 130% to 150%, is an extraordinary and unpredictable feature owing to which the consumer "feels" the liqueur as such in his mouth, in contrast with merely slightly humid prior products. At the same time, despite of the extraordinarily high content of liqueur, the cellular structure of the "bread" component in the pocket cake according to this invention has a surprising mechanical stability and, moreover, the cake is preservable in a sealed package for a long period (at least 3 months, and even 6 months). Thus, in contrast with known artisanal liqueur-imbibed cakes, the pocket cake according to this invention provides a truly "industrial product", capable of being commercially distributed over long distances and vendible with success after weeks or months.

An object of this invention is also a method of making the pocket cake described above. The method is essentially characterized by the steps of:

(i) preparing a bakery dough from wheat flour, sugar, natural yeast (e.g. brewer's yeast), added proteins and water, wherein:

the added proteins amount to 20-30 wt.% of the flour, $\frac{1}{3}$ to $\frac{2}{3}$ proportion of the added proteins consists of gluten, both vital and devitalized, the mount devitalized gluten constitutes from 1/5 to 2/5 of the added proteins;

(ii) raising said dough in the form of a thin layer of initial thickness not exceeding substantially 1 cm, until a 40% to 60% proportion of its complete raising capacity is achieved;

(iii) baking the so raised layer of dough;

(iv) impregnating the resulting carpet of bread with a spirituous sugar-containing liqueur in a weight proportion of at least 1 part liqueur to 1 part bread, with the said liqueur providing at least 25 g sugar per each 100 g bread;

(v) cutting into portions the impregnated bread, and (vi) enrobing the portions with a chocolate containing at least 30 wt.% edible fat.

The method can be carried out continuously or discontinuously, preferably with the use of a tunnel oven. According to a preferred embodiment, the baking step (iii) comprises the sub-steps of first baking the raised layer of dough in a conventional manner, that is by outside heat, until the bread is substantially baked, and terminating the baking process by dielectric heating at a reduced temperature thereby to reduce the humidity content of the bread to a value not exceeding 21 wt.%, preferably not exceeding 20 wt.%. In this manner absorption and retention of the liqueur by the bread are advantageously improved. Preferably, the dielectric heating is adjusted so that the bread temperature is from 100° C. to about 110° C., advantageously from 102° C. to 105° C. In order to favour dispersion of humidity from the bread at this stage it is advisable to make a lot of little holes in the upper surface of the carpet of bread before the latter is passed to the dielectric oven.

THE POCKET CAKE

Figure 1:
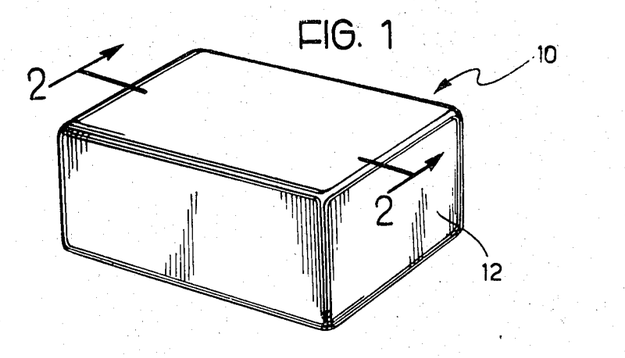
FIG. 1 is a perspective view of a pocket cake according to this invention.

In the embodiment shown in FIG. 1, the pocket cake 10 has the appearance of a parallelepipedic body, the outer surface of which consists of a chocolate coating 12 completely enclosing the remaining components. According to FIG. 2, the coating 12 encloses a single parallelepipedic block 14 of the aforementioned bread obtained together with further similar blocks by longitudinally and transversely severing a single carpet of bread having a thickness denoted by S. Preferably, the thickness S is about 2–2.5 cm, and does not exceed 3 cm, so that the cake may easily be seized by the mouth of the consumer. Also, preferably, the length and width of the block 14 amount to about 5 cm and about 3 cm, respectively, so that the cake may be consumed while being hand-held, without necessitating a dish and a fork (or spoon). The block of bread 14 is impregnated with at least 1 part by weight of the alcoholic, sugar-containing liqueur. The proportion of the liqueur may even amount to the double of the weight of the bread alone; however, the preferred proportion is from 1.3 to 1.5 times the weight of the bread. The composition of the liqueur is selected so as to provide at least 35 ml ethyl alcohol and at least 25 g sugar (sucrose and/or glucose) per each 100 g bread. The amount of water in the liqueur is selected compatibly with the desired strength (e.g. 25–30 Vol.%) of the liqueur and with the solubility of the sugar. An example of a suitable liqueur will be given hereinafter.

Figure 3:
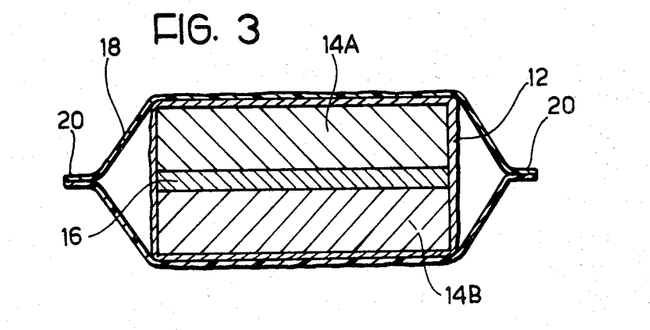
FIG. 3 is a cross-sectional view similar to FIG. 2, of a preferred embodiment of the pocket cake.

In the preferred embodiment, shown in FIG. 3, the aforesaid block of bread is horizontally split into two layers 14A, 14B, preferably of identical thickness (about 1–1.3 cm), adhesively bonded together by interposition of a semisolid or pasty layer of a pastry-cream 16 preferably having a thickness of 3–5 cm. It is to be understood that the two layers 14A, 14B are impregnated with a liqueur in accordance with the criterions described hereinbefore.

The chocolate forming the covering coating 12 contains at least 30 wt.%, preferably from 33% to 35%, of an edible fat, advantageously consisting of a mixture of cocoa butter and cow butter. The amount of fat successfully opposes the natural tendency of the alcoholic liqueur to diffuse into and through the chocolate coating. The thickness of the coating 12 is typically of the order of a few tenths of a millimeter. The coating is easily obtainable by the conventional technique of spray-coating with molten chocolate.

In FIG. 3 the pocket cake is shown hermetically enclosed by a tubular envelope 18 of a film of a synthetic resin admitted for food packaging. The ends of the envelope 18 are gas-tight closed by transverse seals 20.

Figures 4, 5:
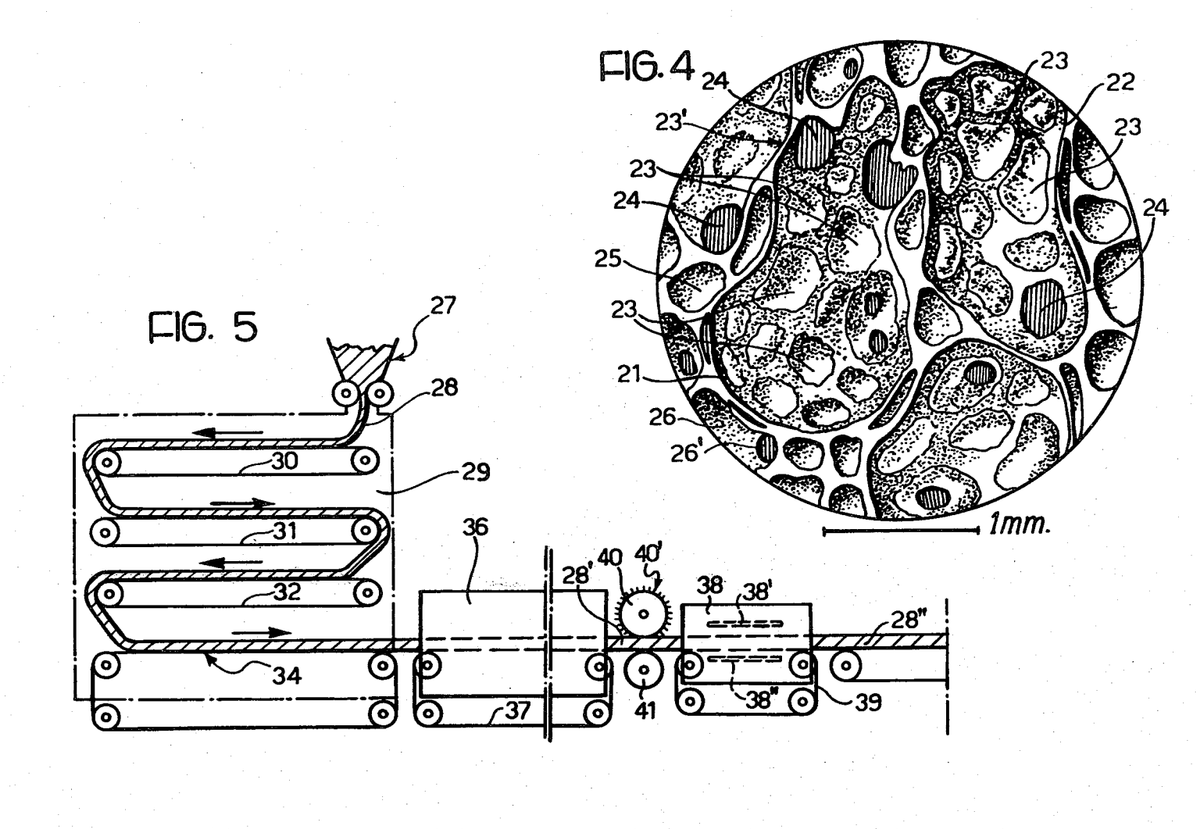
FIG. 4 shows the cellular structure of the liqueur-impregnated bread component contained in the cakes of FIGS. 2 and 3.
FIG. 5 schematically illustrates the dough-raising and baking steps.

FIG. 4 shows a typical structure which becomes visible when the liqueur-impregnated bread component in the pocket cake has been severed e.g. by means of a lancet or razor blade. In contrast with known products, the structure of this bread is prevailingly cellular, in the sense that a largely predominant proportion of the voids is constituted by cells which are either closed or present communication apertures of which the total area in a cell does not exceed 30% of the overall inner surface area of the cell; typically, said total area is less than 10%. This peculiarity becomes particularly evident at a linear magnification of 30–40×; even a magnification of 20× may be sufficient. In FIG. 4, each of the lines denoted by 21 and 22 represents the contour of a cell. The wall of each of these cells is continuous and consists of a plurality of formations 23 resembling to isles or atolls. Each atoll comprises a relatively thin membrane contoured by an annulus of a relatively substantial thickness. A membrane of this character, seen in cross-sectional view, is denoted by 23'. The communications apertures, which are cross-hatched in FIG. 4 and denoted by 24, may be regarded as atolls similar to those 23, the membranes of which, however, bursted during dough-raising and/or baking processes. Owing to the composition of the dough, and also to a specific baking process which will be described hereinafter, the number of burst atolls is extremely low as compared with the total number of atolls. FIG. 4 clearly shows even at a glance that the area occupied by the apertures 24 in a cell is distinctly less than 30% (and even less than 10%) of the total area of the cell. Of course, it may happen to observe in practice also widely burst cells having large communication apertures; however, cells of this character are sporadic only. Finally, besides the "primary" cells such as 21 and 22, the structure also comprises a multitude of secondary cells, of a clearly minor size, as those denoted by 25 and 26. The secondary cells are seldom open; the cell 26 has been shown as comprising a communication aperture 26'. The segment of 1 mm traced at the foot of FIG. 4 gives a precise idea about both the magnification factor and the real size relationships.

It is clear from the above description that the liqueur-impregnated bread contained in the pocket cake according to this invention has a structure which is fundamentally "cellular", in contrast with known breads or cakes having a "spongy" or skeleton-like structure in which only relics of cells are distinguishable. For purely illustrative purposes, it may be said that the prior bread structures are comparable with a concrete- or steel-skeleton of a building, whereas the structure obtained according to this invention is comparable with a building almost entirely formed of walls. It has been found that the integrity of the walls and the density of the lattice formed by the latter in the present product very substantially (if not critically) contribute towards both the retention of the liqueur by the bread and mechanical stability of the cellular structure in its impregnated condition. The absorbed liqueur is practically entirely contained within the walls of the structure, not in the cells, and a substantial proportion of it seems to be retained as hydration liquid, rather than by capillarity. The practical result is that the liqueur has practically non tendency to drain or drip from the product on biting by the consumer.

Figure 2:
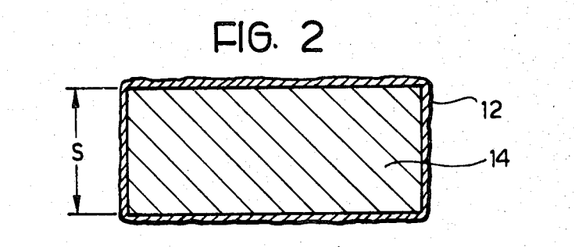
FIG. 2 is a vertical cross-sectional view on line 2—2 of FIG. 1.

It is to be understood that the shape and size of the pocket cake according to this invention can differ, if desired, from those disclosed hereinbefore with reference to FIGS. 1–3. For Example, a stick shape of a size of, say, 10×2.5×2.5 cm may also provide commercially successful. The term "pocket cake" is used here to make clear that the cake has a "pocket" size, substantially not exceeding the dimensions of conventional cigarette packages.

THE DOUGH

The basic ingredient is wheat flour. Its typical composition by weight (on dry basis) is 88–92% starch and, correspondingly, 12–8% wheat gluten. A proportion up to about 10 wt.% of the wheat flour may be replaced by oatmeal or flour of maize.

The preferred sweetener is commercial sugar (saccharose). The amount of sweetener depends upon the desired taste, and it must also be born in mind that a further amount of sugar will also be contained in the liqueur. Typically, the proportion of sugar for making the dough is from about 30 kg to about 50 kg per 100 kg flour; a proportion of 40 kg is usually widely acceptable.

Very characteristic aspects of the invention reside in the added proteins which, as stated hereinbefore, comprise gluten and "ordinary" (non-gluten) proteins. The total of the added proteins is from 20 to 30 kg referred to 100 kg flour. A proportion of from about ⅓ to about ⅔ (7–20 kg) of added proteins consists of gluten; the preferred proportion is ½, corresponding to 10–15 kg. A part thereof must be devitalized gluten; a recommendable proportion by weight is from 1/6 to ¼ on the total of added proteins. Should a vital gluten only be used, kneading of the dough would prove difficult and the dough-raising process would be hardly controllable. At the other hand, excessive proportions of devitalized gluten would produce a bread having poor elasticity and widely burst cells.

The most common devitalized gluten on the market is derived from wheat. However, devitalized gluten obtained from other source, e.g. barley, oats or maize can be used as well.

"Ordinary" (non-gluten) proteins useful for the purposes of this invention can derive from various sources. An egg yolk contains about 17 wt.% proteins. Another source is milk. Milk proteins are commercially available in the form of a powdery product (lactalbumin) containing practically 100% protein. Dehydrated (powdery) skimmed milk contains about 36 wt.% proteins. The use of the latter product would be convenient from economic point of view; however, dehydrated skimmed milk also contains lactose, which easily undergoes lactic fermentation. Therefore, it is advisable to reasonably limit the use of dehydrated skimmed milk, preferably to a proportion not exceeding about 5 wt.% referred to the flour. An advantageous compromise resides in simultaneously using egg yolks, lactalbumin and dehydrated skimmed milk in conveniently selected proportions.

Further ingredients of the dough comprise a fat and an emulsifier for the fat, typically a monoglyceride. Similarly to the commonly known art the fats are here employed in a minimum necessary proportion, preferably not exceeding 5 wt.% referred to the flour and typically amounting to 3–4%. The amount monoglyceride is correspondingly small. The dough may also contain flavours of the type currently used in pastry-making.

Raising of the dough is performed by means of a natural yeast, particularly brewer's yeast. The protein content of the yeast is not to be computed among the "added proteins". The amount yeast substantially corresponds to the conventional routine; that is to say, the yeast proportion is selected such that the volume of the completely raised dough (at 30° C. and 90% relative humidity) is 4–5 times the initial volume. This requirement substantially corresponds to an amount commercial yeast of 5–7% by weight referred to the flour, or to 2–3% by weight referred to the dough.

The proportion of water is selected such as to obtain a consistent dough, as in the conventional bread-making art, bearing in mind that a substantial amount water inherently derives from the added egg yolks. Indicatively, the total water content in the dough is of the order of 60 kg per 100 kg flour, of which 15 kg derive from the yolks and 45 kg are purposely added.

For example, the following composition for the dough is recommendable:

| | | |
|---|---|---|
| 1. Wheat flour | 100.0 kg | |
| 2. Added proteins: | | |
|    wheat gluten vital | 6.0 kg | |
|    wheat gluten devitalized | 6.5 kg | |
|    fresh yolks | 30.0 kg | (=5kg proteins) |
|    lactalbumin (as 100% pure) | 6.25 kg | |
|    dehydrated skimmed milk | 2.5 kg | (=0.9kg protein) |
| 3. Sugar | 42.5 kg | |
| 4. Brewer's yeast | 6.26 kg | |
| 5. Fats, monoglycerids and flavours | 5.0 kg | |
| 6. Make-water | 45.0 kg | |
| Total | 250.00 kg. | |

It will be seen that the total of added proteins in the above recipe is 24.65 kg, corresponding to 24.65 wt.% referred to the flour. The total added gluten is 12.5 kg and, therefore, constitutes about a half of the added proteins. Devitalized gluten is 6.5 kg and, therefore, slightly exceeds 1/5 of the added proteins.

DOUGH-RAISING AND BAKING

Referring to FIG. 5, a dough having, for example, the composition recommended above, is laminated in a mill 27 and the web of dough 28 obtained in this manner is continuously delivered to a leavening chamber 29 kept at 30° C. (±1° C.) and 90% relative humidity. The thickness of the web 28, measured at the outlet of the mill 27, is 0.5 cm, for example. As a general rule, thickness values from about 0.3 to about 0.8 cm are preferred. Greater values are not recommendable, both because they may impair the leavening uniformity and the thickness of the baked product may result excessive.

The leavening chamber may be of the tunnel-type. However, an arrangement is preferred comprising a plurality of band conveyors 30, 31, 32 one beneath the other, whereby the web of dough 28 is overturned on passing from a conveyor to the next one. In this manner the raising process is extremely uniform throughout the whole thickness of the web. In practice, five to seven overturnings of the web are sufficient to obtain a uniformly raised structure. The last conveyor 34 in the leavening chamber delivers the leavened web of dough to a baking oven 36 adjacent the leavening chamber 29.

The residence time of the dough web 28 in the leavening chamber is selected such that the web discharged from the chamber to the oven 36 is raised by 40–60% (generally by about 50%) only, of its total raising aptitude. This requirement corresponds to a thickness value of 2 to 2.5 times the initial value. Under the conditions exemplified hereinbefore, the dough web leaving the chamber 29 will have a thickness of 10–12 mm after a residence time comprised between a minimum of 90 minutes and a maximum of 120 minutes.

The oven 36 is of the tunnel-type, in which the material is conveyed on a band conveyor 37 at a desired speed, for example of 2.8 meters/minute (4.7 cm/sec). The oven is internally equipped with heating means, such as gas burners of electric resistors, adjustable so as to maintain the inner atmosphere in the oven at a desired temperature, typically in the range of 200°–240° C. Higher temperatures are not advisable, mainly because they may easily lead to the formation of a relatively hard crust necessitating a subsequent removal. Temperatures lower than 200° C. may be adopted depending upon the circumstances. Generally speaking, the baking conditions are selected in accordance with those conventional principles leading to the so-called sponge-cake, that is, to a bread having an extremely fine soft skin practically non perceptible in the mouth on consumption.

The baking process in the tunnel oven 36 is due to heat delivered from the outside (that is, from the atmosphere in the oven) to the material being baked. In this manner, however, a bread is obtained averaging 23–25 wt.% humidity. According to the invention, it would be desirable to have a bread having a more reduced humidity content, not exceeding 21 wt.% and preferably not exceeding 20 wt.%. To achieve this result, in accordance with a specific aspect of the invention the baking step by means of external heat is followed by a final baking step by dielectric heating which notoriously produces heat directly in the body of the material, this final baking step being mainly directed to produce evaporation of excess humidity from the bread rather than to further bake the latter. Thus, as is shown in FIG. 5, a dielectric oven 38 is provided downstream of the tunnel oven 36, and the carpet of bread 28' leaving the tunnel oven 36 is conveyed through the dielectric oven 38 by means of a band conveyor 39. Heating in the dielectric oven 38 is conducted so that the temperature of the bread therein is sufficient to produce the desired degree of dehydration within a reasonably short time without, however, substantially increasing the degree of baking produced in the tunnel oven 36. The said temperature preferably is in the range of 100°–110° C., typically 102°–105° C. The dielectric material of the band of the conveyor 39 is therefore selected to withstand this temperature. Various synthetic resin compositions of low dielectric loss are currently available to this end. For example, polyester resins such as poly(ethylene terephthalate) are suitable. The oven 38 moreover comprises, in a manner known per se, electrode plates 38', 38" between which the carpet of bread 28' is conveyed by the conveyor 39.

According to an experienced embodiment, the dielectric oven 38 may be designated as follows:
  frequency 27 MHz
  max.power 50 kW
  field between the electrodes 20 kV (peak-to-peak)
  length of the electrodes 1.5 meters
  length of the oven 2 meters.

With the travelling speed of 2.8 m/min exemplified hereinbefore the residence time in the oven 38 designed as suggested above is about 40 seconds and the carpet of bread 28" leaving the oven has a humidity content not exceeding 21 wt.%. Preferably, hot air at 75°–80° C. is blown into the entrance end of the oven 38, while the exit end is equipped with a blower (not shown) for evacuating humid air from the oven.

It is to be recalled that the carpet of bread 28' leaving the tunnel oven 36 presents the aforementioned thin skin on its exposed surface which hinders evaporation of humidity from the bread in the dielectric oven 38. Therefore, according to the invention, it is convenient to render said skin foraminous prior to dielectric heating. In the embodiment shown in FIG. 5 the dielectric oven 38 is spaced from the tunnel oven 36 by an amount allowing accomodation between the ovens of a pair of cylinders 40, 41 between which the carpet of bread 28' is caused to travel. The upper cylinder 40 carries rows of perforating pins 40' having sharp conical tips, of a diameter of about 1 mm, which perforate the upper face of the bread carpet 28' through a small depth, typically of 1–2 mm. The density at which the pins 40' are distributed on the surface of the cylinder 40 preferably amounts to at least 5–6 pins/dm$^2$. This density is sufficient to obtain from the dielectric oven 38 a carpet of bread 28" having a humidity content of less than 20 wt.% even by operating the oven 38 at its half-power (10 kV).

In the embodiment comprising the dielectric oven 38 some particular conditions are advisable for the tunnel oven 36. Thus, the heating means (e.g. gas burners) in the oven 36 should advantageously be controlled by groups so as to provide in the oven a first section (inlet section) at oven temperature of 200°–230° C. of a length corresponding to a residence time of 4–15 minutes, and a subsequent section at oven temperature of 170°–190° C. of a length corresponding to a residence time of 10–20 minutes, and by a still subsequent section (final section) which is not heated and in which the carpet of bread already practically baked travels during 2–3 minutes or more to cool to about 100° C. As a preferred embodiments the following values may be adopted;

for the first section, temperature of 200°–220° C. and a length of 40 meters corresponding to a residence time of 14.3 minutes at the travelling speed of 2.8 m/min;

for the second section, temperature of about 180° C. and a length of about 30 meters corresponding to a residence time of 10.7 minutes;

for the final section, a length of 5 meters corresponding to a residence time of about 2 minutes.

The carpet of bread 28" leaving the dielectric oven 38 has typically a thickness of 24–26 mm (with the starting data exemplified hereinbefore) and is cooled to a temperature of about 30° C. e.g. by cooling blowers not shown on the drawing. The bread has a substantially uniformly developed cellular structure, essentially comprising primary cells of a size from about 1 mm to about 2 mm separated from each other by substantially complete microporous walls. The spaces left free by the primary cells are occupied by secondary cells of a size from about 0.3 to about 0.6 mm. The communication apertures (if any) in the walls of primary cells are typically circular, or nearly circular, of a diameter from about 0.1 to about 0.3 mm and occupy generally less than 10% of the cell surface. This appearance may readily be observed optically at a magnification of 30–40 times. The bread has no tendency to crumble; even, the elastic recovery after compression is very high, typically of at least 85% without, however, giving rise to a "gummy" feel on mastication. With the hereinbefore suggested data, the density of the bread is about 0.17 g/cu.cm.

Figure 6:
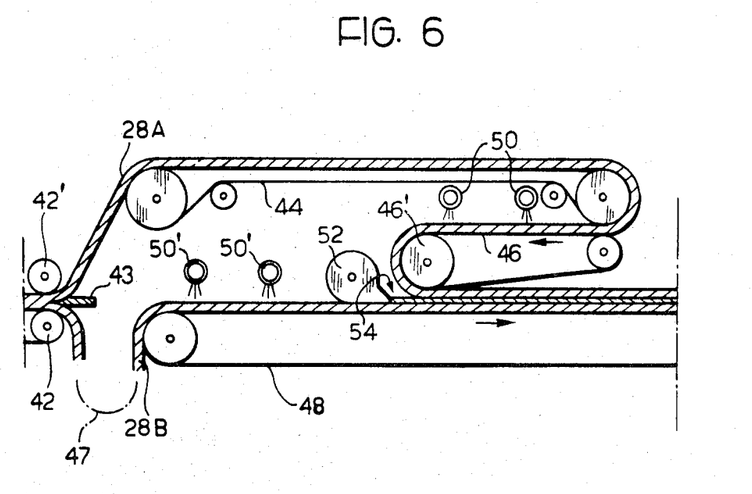
FIG. 6 schematically shows the impregnation step.

FIG. 6 is an extension of FIG. 5. On passing from FIG. 5 to FIG. 6 the carpet of bread 28″ (having a width of 80 cm, for example) is taken up by rolls 42, 42′. Exactly on the horizontal mid plane between the rolls a blade 43 splits the bread carpet 28″ into two layers 28A, 28B having each the half-thickness of the carpet 28″.

The upper layer 28A, the upper surface of which comprises the skin mentioned hereinbefore, travels at first in forward direction (machine direction) on a band conveyor 44 through a distance of several meters, and is subsequently directed backwards by means of a conveyor 46, whereby the length of bread supported by the latter conveyor freely exhibits upwardly its cellular structure. The lower layer 28B forms a compensation loop 47 and is conveyed forwardly on a band conveyor 48 on which the layer 28B exhibits upwardly its cellular structure.

THE LIQUEUR AND IMPREGNATION

Reference numerals 50 in FIG. 6 denote a plurality of spray tubes arranged overneath the conveyor 46, each having a row of spray orifices or nozzles directed downwardly and spaced therebetween by, say, 4–5 cm along the respective tube. Similar spray tubes denoted by 50′ are arranged overneath an initial section of the conveyor 48. The tubes 50, 50′ extend transversely to their associated conveyors. FIG. 6 shows two tubes 50 and two tubes 50′. The reciprocal spacing of the tubes 50 corresponds to about half minute travel of the bread layer 28A and, similarly, the spacing of the tubes 50′ corresponds to about half minute travel of the bread layer 28B. With the speed indicated hereinbefore (2.8 m/min) said spacing amount each to about 1.4 meters. Obviously, this specific arrangement is convenient, but not compulsory. What matters in practice is that the liqueur portion sprayed by a first tube has enough time to be substantially absorbed by the layer of bread before the latter receives a further amount liqueur from the subsequent tube.

Some suggestions regarding the liqueur have been set forth hereinbefore. It is important that the liqueur should provide at least 35 ml ethyl alcohol and at least 25 g sugar per each 100 g bread. Since ethyl alcohol limits the solubility of the sugar, the upper limits of the sugar and alcohol contents in the liqueur result automatically from the solubility relation. A suitable liqueur can be obtained, for example, by dissolving 20 kg sugar in 40 kg water and adding 40 kg commercial rhum of a 60 vol.% strength. Each gram liqueur obtained in this manner contains 0.21 g alcohol and 0.20 g sugar. Its density is about 1.05 g/ml.

With the data exemplified hereinbefore, each 1 cm length of the bread layers 28A, 28B (FIG. 6) weighs about 16.3 grams, and about 76 grams bread per second travel beneath each of the spray tubes 50, 50′. In order to obtain an impregnation degree of 130–135 grams liqueur per each 100 grams bread each of the layers 28A, 28B should receive 100–103 g/sec of the liqueur composition just suggested above, corresponding to about 37 ml alcohol and about 27 grams sugar per each 100 grams bread. Advantageously, the first of the tubes 50 is supplied with about 40 g/sec liqueur and the second tube 50 is supplied with about 60 g/sec liqueur; a similar expedient applies to the tubes 50′. Of course, other convenient values may be experienced in practice. Also, when the bread layers 28A, 28B are relatively thin (e.g. less than 1 cm), a single tube 50 and a single tube 50′ are usually sufficient.

After impregnation, the upper layer 28B is guided down around the roll 46′ of the conveyor 46 to travel now again in forward direction in confluent relation with the lower layer 28B.

FINAL PROCESSING

Figure 7:
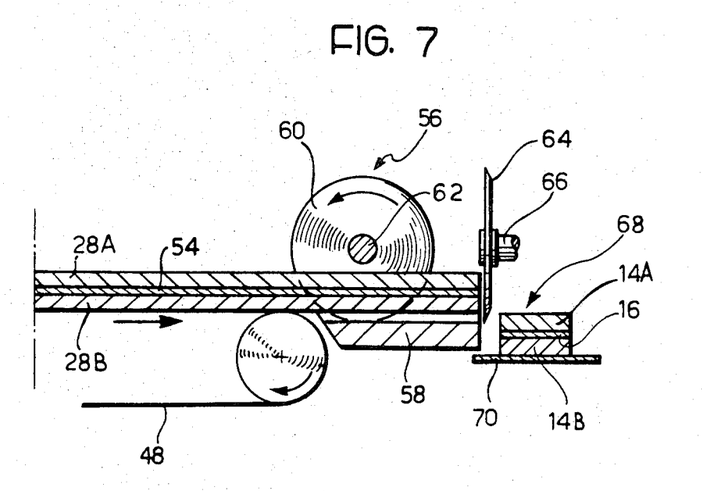
FIG. 7 is an extension of FIG. 6 showing the cutting step.

Immediately upstream of the zone of confluence of the two layers 28A, 28B of impregnated bread an extruder 52 is arranged to extrude onto the lower layer 28B a layer of cream 54 of a convenient thickness, e.g. about 3–4 mm. The upper layer 28B of bread is superposed onto the cream layer 54, usually under a slight pressure of the roll 46′, whereby the two layers of bread are adhesively bonded together by the layer of cream. The laminate or sandwich obtained in this way is continuously forwarded by the conveyor 48 to a longitudinal cutting group shown in FIG. 7. The group comprises a lengthwise slotted table 58 for supporting the laminate, and a plurality of circular cutting blades 60 indentical to each other, keyed on a common transverse rotary shaft 62 at locations corresponding to the slots in the table. For example, the mutual spacing of the blades is advantageously 3 cm, whereby the said laminate (80 cm wide) is longitudinally cut into twentysix strands and its edges are trimmed by the first and the last blade of the system of blades 60. Immediately downstream of the longitudinal cutting group a transverse severing group is arranged, which may be of the guillotine type or, as shown in FIG. 7, may comprise a single circular blade 64 keyed on a rotary shaft 66 parallel to the direction of travel of the aforesaid laminate. After every 5 cm of advance of the laminate the shaft 66 performs a rapid transverse stroke, whereby a cake such as 68 is cut from each of the twentysix strands and falls onto a transverse conveyor band 7. It will be noted that the component of the cake 68 in FIG. 7 are denoted by the same reference numerals used in FIG. 3. The cakes 68 are conveyed by the conveyor band 70 to an enrobing station (not shown) at which each cake is enrobed with a molten chocolate comprising at least 30 wt.% edible fat, advantageously by the technique of spray-coating on a net-like support, in substantial analogy with the production of chocolate-enrobed biscuits, for example. The enrobed cakes are then cooled and enclosed each in an envelope 18 shown in FIG. 3.

To obtain a pocket cake such as that shown in FIG. 2, not comprising the layer of cream, the two layers of bread as those denoted by 28A, 28B in FIG. 6 are not coupled together but, instead, after impregnation with liqueur are separately cut into blocks 14 (FIG. 2) which are subsequently enrobed with molten chocolate.

The pocket cakes according to this invention are preservable through a surprisingly long period (even of 6 months or more) without prejudice to their consistency and taste. Moreover, the bread component of the cake very tenaciously retains its imbibing liqueur even when, as may sometimes occur, the chocolate coating 12 is not absolutely hermetic.

I claim:

1. A pastry product of pocket size preservable in a sealed package for extended periods of time without degradation in consistency and taste comprising:
   (a) a portion of baked sweet bread impregnated with a spirituous sugar-containing liqueur in a proportion of at least 1 part by weight liqueur to 1 part by weight bread;

(b) a coating of chocolate completely enveloping said portion of bread;

(c) the said liqueur providing at least 35 ml ethyl alcohol and at least 25 grams sugar in each 100 grams bread;

(d) said chocolate containing at least 30 wt.% of edible fat;

(e) the said bread having prevailingly a cellular structure in which the total area of the eventual apertures through which a cell communicates with its adjacent cells does not exceed 30% of the total internal area of the cell.

2. A product according to claim 1, wherein the said sugar is saccharose or glucose.

3. A product according to claim 1, wherein that the liqueur proportion is from 1.3 to 1.5 parts by weight.

4. A product according to claim 1, wherein the edible fat is cocoa butter or a mixture of the latter with cow butter.

5. A product according to claim 1, wherein the total area of said apertures does not exceed 10% of said total internal area.

6. A product according to claim 1, wherein the said portion of bread consists of two superposed layers bonded together by a relatively thin layer of cream.

7. A product according to claim 1, wherein the said portion of bread is of parallelepipedic shape.

8. A product according to claim 7, wherein the thickness of the said portion of bread does not substantially exceed 3 cm.

9. A product according to claim 8, wherein the size of said portion of bread is substantially $5 \times 3 \times 2.5$ cm.

10. A product according to claim 1, wherein said liqueur is an aqueous alcoholic liqueur.

11. A product according to claim 1, wherein said chocolate completely encloses said bread, providing a fluid-tight envelope therearound.

12. A product according to claim 1, which upon consumption by a consumer, exhibits practically no tendency of liqueur draining or drippage.

* * * * *

UNITED STATES PATENT AND TRADEMARK OFFICE
CERTIFICATE OF CORRECTION

PATENT NO. : 4,362,751
DATED : December 7, 1982
INVENTOR(S) : Amilcare Dogliotti It is certified that error appears in the above-identified patent and that said Letters Patent is hereby corrected as shown below:

Column 2, line 36, "mount" should be --amount--;

Column 4, line 26, "bursted" should be --burst--;

, line 67, "non" should be --no--;

Column 6, line 4, "amount yeast" should be --amount of yeast--;

lines 9-10, "amount commercial" should be --amount of commercial--;

Column 10, line 26, "twentysix" should be --twenty-six--.

Signed and Sealed this

Third Day of April 1984

[SEAL]

Attest:

GERALD J. MOSSINGHOFF

Attesting Officer

Commissioner of Patents and Trademarks